United States Patent [19]

Specktor et al.

[11] Patent Number: 4,831,744
[45] Date of Patent: May 23, 1989

[54] BUSHING INDEXING TOOL AND METHOD FOR CASTER AND CAMBER ADJUSTMENT

[75] Inventors: Gerald A. Specktor, St. Paul; John Specktor, Golden Valley, both of Minn.

[73] Assignee: Shim-A-Line, Inc., Minneapolis, Minn.

[21] Appl. No.: 104,323

[22] Filed: Oct. 2, 1987

[51] Int. Cl.⁴ .............................................. B62D 17/00
[52] U.S. Cl. ...................................... 33/600; 280/661
[58] Field of Search ..................... 33/600, 612, 203.18, 33/193; 29/271, 407; 280/661

[56] References Cited

U.S. PATENT DOCUMENTS

| | | |
|---|---|---|
| 2,859,058 | 11/1958 | Traugott . |
| 2,923,555 | 2/1960 | Kost et al. . |
| 3,163,441 | 12/1964 | Traugott . |
| 3,342,507 | 9/1967 | Koch et al. . |
| 3,866,938 | 2/1975 | Boyd et al. . |
| 4,026,578 | 5/1977 | Mattson . |
| 4,232,880 | 11/1980 | Dickerson et al. . |
| 4,252,338 | 2/1981 | Ingalls et al. . |
| 4,400,007 | 8/1983 | Ingalls . |
| 4,509,772 | 4/1985 | Drotar et al. . |
| 4,641,853 | 2/1987 | Specktor et al. . |

OTHER PUBLICATIONS

Ingalls Catalog No. 840, Ingalls Engineering Company, Inc., 1984.

Primary Examiner—Harry N. Haroian
Attorney, Agent, or Firm—Kinney & Lange

[57] ABSTRACT

The present invention includes a bushing indexing tool having an aperture in its upper surface which may be reproducibly located around a rotatable caster and camber adjustment offset bushing. A scale disposed around the aperture indicates the angular position of the bushing with respect to the steering structure. The invention also includes a data base to predetermine the desired rotational angular setting of a particular bushing in order to correct caster and camber.

13 Claims, 3 Drawing Sheets

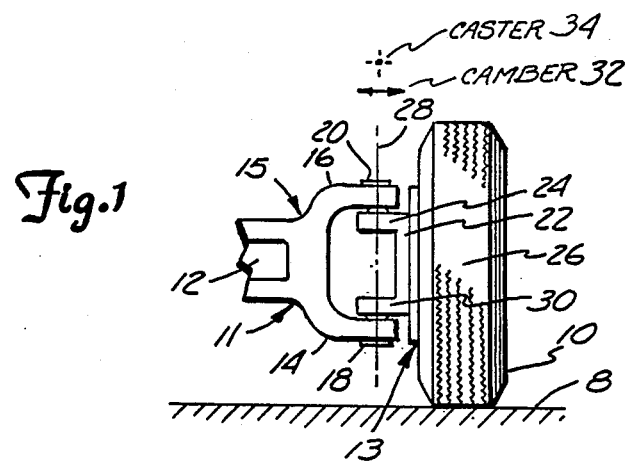
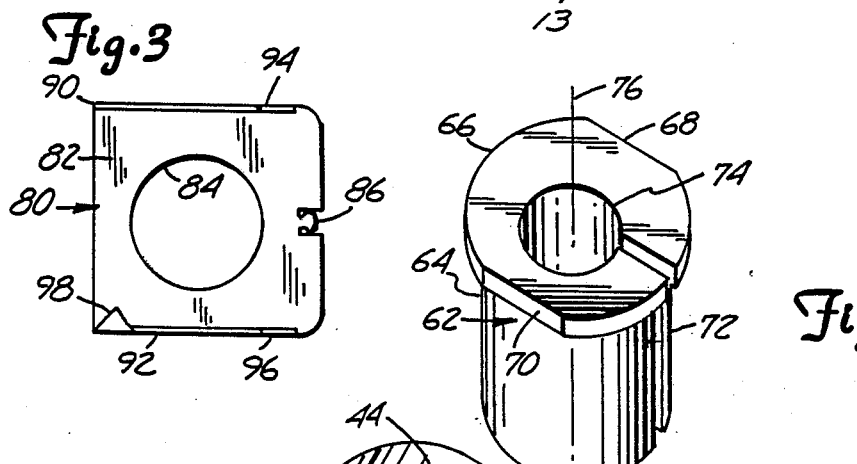
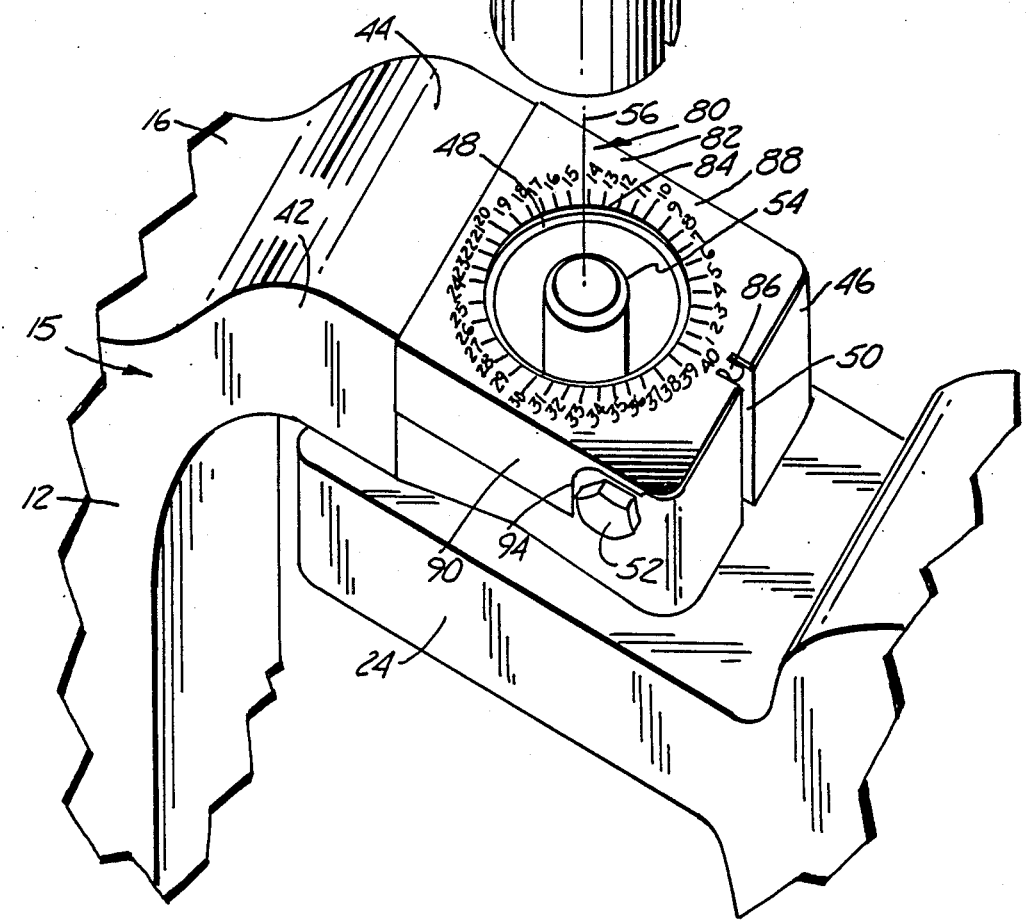

LEFT WHEEL CHART

Fig. 4a

RIGHT WHEEL CHART

Fig. 4b

BUSHING INDEXING TOOL AND METHOD FOR CASTER AND CAMBER ADJUSTMENT

BACKGROUND OF THE INVENTION

1. Field of the Invention

The present invention relates generally to wheeled vehicle steering structure alignment. More particularly, the invention relates to a tool and data base for the indexing of bushings for the adjustment of caster and/or camber in a steering structure of a wheeled vehicle, and to a method of efficiently setting the caster and camber of a vehicle steering structure using the tool and data base of the present invention.

2. Description of the Prior Art

Various rotatable adjusting bushings have been used to adjust caster and camber in wheeled vehicle steering structures. These steering structures typically include a yoke carried at an end of a front axle. At least one arm of the yoke has an opening for receiving the bushing. A wheel spindle assembly is pivotally mounted on the yoke by ball joints having a stud extending through the opening in the yoke arm, in locking engagement with the bushing. The adjusting bushing displaces the associated ball joint from the axis of exterior surface of the bushing. The orientation of the bushing within the opening determines the direction of the displacement, which is reflected as a change in the pivotal axis of the spindle and thus as changes in caster, camber or both.

Koch et al. U.S. Pat. No. 3,342,507 describes a relationship between caster and camber changes resulting from adjusting camber with an eccentric bushing. The associated king pin includes an indicating arrow or like indicia to facilitate a visual check of the camber change. The associated but undesired caster changes require additional corrective shimming elsewhere in the steering structure.

Dickerson et al. U.S. Pat. No. 4,232,880 describes an eccentric bushing having an axially offset bore. The Dickerson et al. bushing has a slot and an integral serpentine collar which facilitates manual grasping and rotation of the bushing to adjust the caster and camber of the wheel assembly. Collectively the caster and camber describe the pneumatic trail of the tire. The stud of the ball joint taught by Dickerson is threaded and may be secured by tightening an associated nut.

Drotar et al. U.S. Pat. No. 4,509,772 discloses one-piece bushings similar in structure and use to the Dickerson bushing but with the inner bore axis either angled or skewed to the axis of the outer surface cylinder. Such bushings allow a greater amount of offset than eccentric bushings. Other patents indicative of offset bushings include Mattson U.S. Pat. No. 4,026,578, Traugott U.S. Pat. No. 2,859,058 and Traugott U.S. Pat. No. 3,163,441.

With most prior art bushings, the bushing is installed and then adjusted by trial and error. Specifically, readings are taken as the bushing is rotated. This process continues until an acceptable combination of caster and camber is achieved. Finally, the ball joint stud and associated bushing are secured in the yoke. An example of this type of assembly is U.S. Pat. No. 4,400,007 to Ingalls. Once the Ingalls bushing is properly positioned, a lock ring is coincidentally fixed to the bushing and positioning lugs carried by the yoke to secure the assembly. U.S. Pat. No. 4,252,338 to Ingalls et al. describes an externally threaded bushing threaded into an internally threaded bore defined in a yoke. The Ingalls bushing may be an offset or a skewed bushing. Further, Ingalls mentions the possibility of providing a chart, graph or formula for the convenient determination of the amount of offset required and the orientation of the bushing appropriate to provide a multitude of corrective caster and/or camber settings.

Ingalls also describes a method of alignment. In the Ingalls method, misalignment is measured; a chart, graph or formula is used to select an appropriate bushing, the bushing is exchanged into the upper housing and oriented by means of an indexing mark (or a bushing slot). Finally, the assembly is secured.

Kost et al. U.S. Pat. No. 2,923,555 describes an eccentric bearing, preferably threaded, which forms the cone section of a ball joint in a steering assembly. Rotational adjustment of the eccentric bearing adjusts caster and/or camber of the steering assembly. Additionally, Kost shows a removable precalibrated scale to facilitate indexing of the bearing members when adjusting caster and/or camber. The Kost bearing includes a direction indicating mark. Kost's scale is an arctuate-shaped piece of thin, flat material which rests on top of the axle and is positioned by a pin or protrusion which fits within a slot from a split in the axle. The scale of Kost is precalibrated to the particular bearing in use.

Additionally, precalibrated scales are known in preset type adjustable offset bearings. For example, in Ingalls catalog No. 840 an adjustable bushing including an inner sleeve having an eccentric bore of an outer sleeve is disclosed. Precalibrated scales are fixed to the outer surface of each sleeve. The camber and caster provided by the bushing is set by rotating the inner sleeve with respect to the outer sleeve until selected reference symbols on each scale are aligned. Both sleeves must be circumferentially expanded, by drawing a tapered shaft of a ball joint through the inner sleeve bore, to secure the bushing in place on the yoke.

Spector et al. U.S. Pat. No. 4,641,853 describes removable scales attached to preset bushings. The scales are used on conjunction with a correlating chart to preset the bushing offset and second to preset the offset orientation which results upon installation of the bushing on the vehicle. The method includes using "splits" in the bushing as indicators and selecting from among a plurality of bushings.

SUMMARY OF THE INVENTION

The present invention includes a tool for assisting in aligning a wheeled vehicle steering structure having a rotatable caster and camber adjustment offset bushing with an angular orientation indicium.

The tool includes an aperture in the face of the tool. A scale is disposed around the aperture. The scale has a plurality of indicia, each indicia indicating an angular position of the offset bushing with respect to the steering structure. The tool includes attachment means to attach to an operable location on a yoke arm of the steering structure. The tool combines with a data base, which correlates each indicia with the resulting caster and camber combination, to form an alignment assistance kit.

The invention also includes a method of using the tool to assist in aligning a wheeled vehicle steering structure.

BRIEF DESCRIPTION OF THE DRAWINGS

FIG. 1 is an elevational of the backside of a right front steering structure of a wheeled vehicle;

FIG. 2 is a partially exploded perspective view of a preferred embodiment of an indexing tool on the steering structure;

FIG. 3 is a bottom view of a preferred embodiment of the tool of FIG. 2; and

FIGS. 4A and 4B are preferred embodiments of the data base.

DETAILED DESCRIPTION OF THE PREFERRED EMBODIMENTS

FIG. 1 is provided to present the framework of the environment to which this invention applies. In FIG. 1, a steering structure 11 in a wheeled vehicle is generally shown. A road surface 8 supports a pneumatic tire 10 on a wheel 13. Extending from an end portion 12 of the axle is a yoke 15 having a lower yoke arm 14 and an upper yoke arm 16. The lower yoke arm 14 has a lower ball joint assembly 18. The upper yoke arm 16 also has an upper ball joint assembly 20. The ball joints will be discussed in more detail later. Generally, one or both of the ball joints 18 and 20 may be adjustable; typically, only the upper ball joint assembly 20 is adjustable with respect to the upper yoke arm 16.

A spindle 22 has an upper spindle arm 24 and a lower spindle arm 26. The upper spindle arm 24 contains a socket (not shown) which rotates on the ball (not shown) of the upper ball joint assembly 20. Similarly, the lower spindle arm 26 contains a socket (not shown) which rotates on the ball (not shown) of the lower ball joint assembly 18. Together, the two ball joint assemblies 18 and 20 and the sockets of the two spindle arms 24 and 26 define a pivotal axis 28, roughly perpendicular to the road surface, on which the spindle 22 may pivot relative to the axle 12 and the vehicle (not shown).

Also attached to the spindle 22, is a wheel attachment 30, which holds the wheel 13 on a hub (not shown) and allows the wheel 13 to rotate on a pair of bearings (not shown) about an axis of the hub (not shown) which is roughly perpendicular to the pivotal axis 28. The tire 10 is mounted on the rotating wheel 13. Pivoting about the pivotal axis 28 alters the angular relationship between the tangential path of the tire 10 on the road surface 8 and the axle end 12; thus, steering the wheeled vehicle (not shown).

In use, the steering structure also defines the manner in which the tire 10 contacts the road surface 8. In actual operation, striking common road hazards, such as potholes and curbs, deforms various members of the steering structure. Altering the actual location of the pivotal axis 28 from the vehicle manufacturer's original design specification generally adversely effects a combination of vehicle properties including tire wear and vehicle handling. In turn, vehicle operational expenses and safety are adversely effected.

For example, laterally altering the pivotal axis 28 by moving the upper ball joint assembly 20 closer to the axle end 12 results in shifting the point of load toward the inward edge of the tire 10 resulting in accelerated wear on the inward edge and simultaneously reducing the amount of tire surface contacting the road surface 8. Additionally, handling properties will be affected.

Alternatively, laterally altering the pivotal axis 28 by shifting the lower ball joint assembly 18 closer to the axle end 12 shifts the point of load toward the outward edge of the tire 10 resulting in accelerated wear on the outward edge and simultaneously reducing the tire surface contacting the road surface 8. Again, handling properties will be affected.

Changes in alignment of this nature are known in the trade as "camber" 32. Camber 32 is measured in degrees that the center line of the wheel carrying the tire 10 is inclined from a true vertical plane perpendicular to the front axle and normal to the road surface when viewed from the front of the vehicle. A positive camber occurs when the top of the wheel is further out than the bottom of the wheel. A slight amount of positive camber reduces the steering effort required to turn the vehicle and additionally reduces the loading and rate of wear of the outer wheel bearing (not shown).

Additionally, the pivotal axis 28 has a fore and aft inclination parameter which is known in the trade as caster 34. Caster 34 is defined as the number of degrees that the pivotal axis 28 is inclined from a true vertical plane including the front axle; a positive angle is when the top of the pivotal axis 28 is more rearward on the car than the bottom of the pivotal axis 28. A slight positive "caster" tends to increase the directional stability of the vehicles' steering and thus reduce susceptibility to cross wind or road surface deviations.

In FIG. 2, a partly exploded view of the upper side of a steering structure is illustrated with a tool 80 of this invention. Beginning from the end of the axle 12, the upper yoke arm 16 has a rearward surface 42, an upward surface 44, an outward end 46 and a frontward surface (not shown). The upward surface 44 has a bushing receiving opening 48 which is generally cylindrical in shape and extends generally vertically through the yoke arm 16. Extending radially from the bushing receiving opening 48 to the end of the arm 46 is a yoke slot 50. Extending through the upper yoke arm 16, from the rearward surface 42 to the forward surface and bridging the yoke slot 50 is a pinch bolt 52. Tightening the pinch bolt 52 narrows the yoke slot 50 and also reduces the radius of the bushing receiving opening 48. Beneath the upper yoke arm 16, the upper spindle arm 24 is visible. Within the bushing receiving opening 48 is a stud 54 extending upward from the ball of the ball joint assembly 20 (of FIG. 1). Generally, the stud 54 is tapered and generally, the stud axis 56 will run through the center of the ball of the ball joint assembly 20 (of FIG. 1).

Exploded upward from the steering assembly is a typical adjustment bushing 62. The bushing includes a generally cylindrical surface 64 of radius approximately equal to the bushing receiving opening 48, a shoulder 66 radially extending from the top end with two flats 68 and 70 to facilitate rotation, a slot 72 extending radially inward from both the shoulder 66 and the cylindrical surface 64 to a bore 74 extending generally from top to bottom through the bushing 62. Typically, the shape of the bore 74 mates with and matches the shape of the stud 54, i.e. a tapered bore 74 mating with a tapered stud 54. The bore axis 76 of the bore 74 is preferentially in a parallel but offset relationship to the axis of the cylindrical surface 64 of the bushing 62, i.e. an eccentric relationship. However, other relationships are possible, for example, angled axes or skewed axes, both of which potentially provide more extreme adjustments than the preferred eccentric type arrangement.

The adjustment bushing alters the steering structure parameters in the following manner: the bore axis 76 differs from the axis of the cylindrical surface 64. When the adjustment bushing 62 is installed within the bushing receiving opening 48 of the upper yoke arm 16 and the ball joint stud 54 mated with the bore 74 and the pinch bolt 52 tightened, the stud axis 56 will be offset within the bushing receiving opening 48. With the pinch bolt 52 released, rotating of the bushing 62 within the bushing receiving opening 48 offsets the ball of the upper ball joint assembly 20 (of FIG. 1) in various directions. The angular orientation of the offset determines the distribution of the offset between the caster 34 (of FIG. 1) and camber 32 (of FIG. 1) parameters of the steering structure. Thus, the alignment may be altered.

The amount of total offset is determined by the particular bore axis 76 of the bushing 62. An array of bushings 62 with incrementally increasing offsets is available to handle all but very extreme adjustments. The angular orientation of the bushing 62 within the bushing receiving opening 48 determines how the offset will change the caster 34 and camber 32.

An additional problem exists with the efficiency of this alignment adjustment system. Thus far, the choice of an appropriate adjustment bushing 62 from an array of bushings has been a trial and error procedure. Further, the angular orientation of each bushing 62 which is tested by an alignment technician has also been a trial and error procedure. These trial and error procedures consume an inordinate amount of time, thus increasing the cost to the consumer of alignment procedures. Frequently, such routine maintenance is postponed or deferred by the consumer because of the associated high cost.

However, as illustrated in part in FIG. 2, the bushing indexing tool 80 can be efficiently employed to eliminate part of the trial and error of the alignment adjustment procedure. The tool 80 includes a plate having an upper tool surface 82, with an aperture 84 extending through the plate and a locating protrusion or prong 86 which depends from a notch in the outward end of the plate. Disposed around the aperture 84 is a scale or set of indicia 88. The size and outline of the upper tool surface 82 are such that they generally correspond to the upper yoke arm upward surface 44 of the upper yoke arm 16 from the corner with the outer yoke end 46 and extending inward, substantially past the bushing receiving opening 48. Depending from the forward and rearward edges of the upper tool surface 82 are flanges (in this view, only the rear flange 90 is visible) which are generally rectangular in shape.

The outward edge of both of the flanges have notches (in this view, only the rear flange notch 94 is visible). The notches are located such that when the tool 80 is installed against the upper yoke arm upward surface 44, the pinch bolt 52 fits within the notch 94, thus allowing the flanges 90 to engage the respective front and rear upper yoke arm face 42.

The aperture 84 is located on the upper tool surface 82 such that when the bushing indexing tool 80 is installed on the upper yoke arm 16, the aperture 84 is concentric with the bushing receiving opening 48. Further, the radius of the aperture 84 is slightly larger than the radius of the bushing shoulder 66 so that the tool 80 may be installed or removed with the bushing 62 installed in the bushing receiving opening 48.

In FIG. 3, a bottom view of the aperture extending through the plate of the tool 80 reveals another feature. On the inward lower edge of forward depending flange 92, is an inward projecting tab 98. The material and nature of the bushing alignment tool 80 is such that the flanges 92 and 94 have resilient quality. When installed, the tab 98 pushes against the upper yoke arm frontward surface, while the rearward flange 90 pushes against the upper yoke arm rearward surface. 42. In a preferred embodiment, the tab 98 provides a frictional attachment to the steering structure. Alternatively, the tab 98 provides a "snapping" action as the tool 80 is installed. Removal of the tool also involves a frictional or "snapping" action. The tool 80 holds itself in the installed position without further effort by the technician.

Additionally, the arrangement of the various members of the tool 80 is such that a unique, reproducible installation position is achieved each time a technician attaches the tool 80 on any upper yoke arm 16 of this design. Specifically, the prong 86 fits into yoke slot 50, and notches 94 and 96 of flanges 90 and 92 reproducibly position the aperture in a concentric location about the bushing receiving opening 48 and the scale 88 is always properly aligned relative to the yoke slot 50. Finally, the alignment technician may remove the tool 80, over the bushing 62, by "snapping" the tool 80 free of the upper yoke arm 16. Again, the frictional or "snapping" action results, in part, from inward projecting tab 98 and, in part, from the resilient nature of the flanges 92 and 94.

Figure 4A:
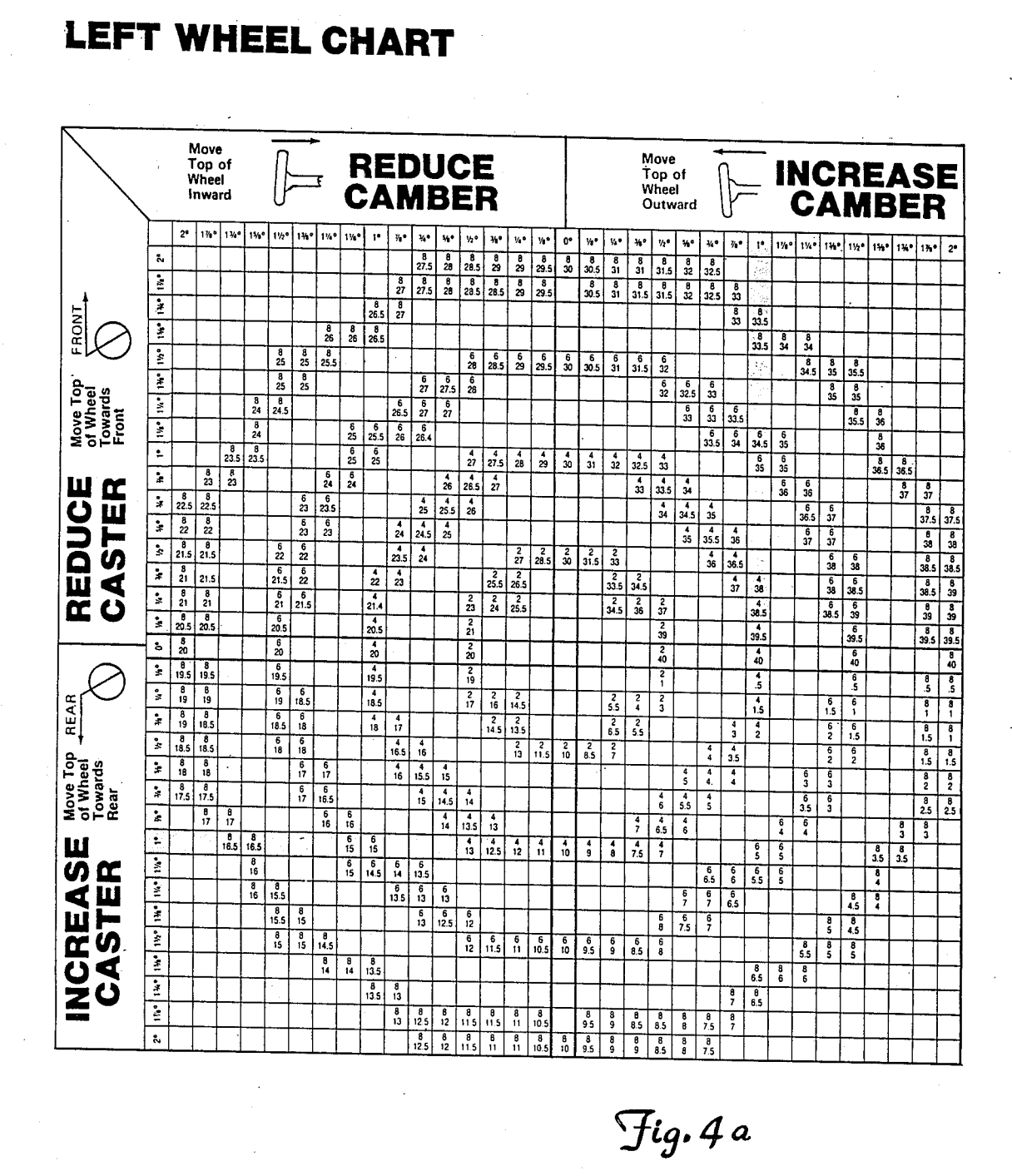
Figure 4B:
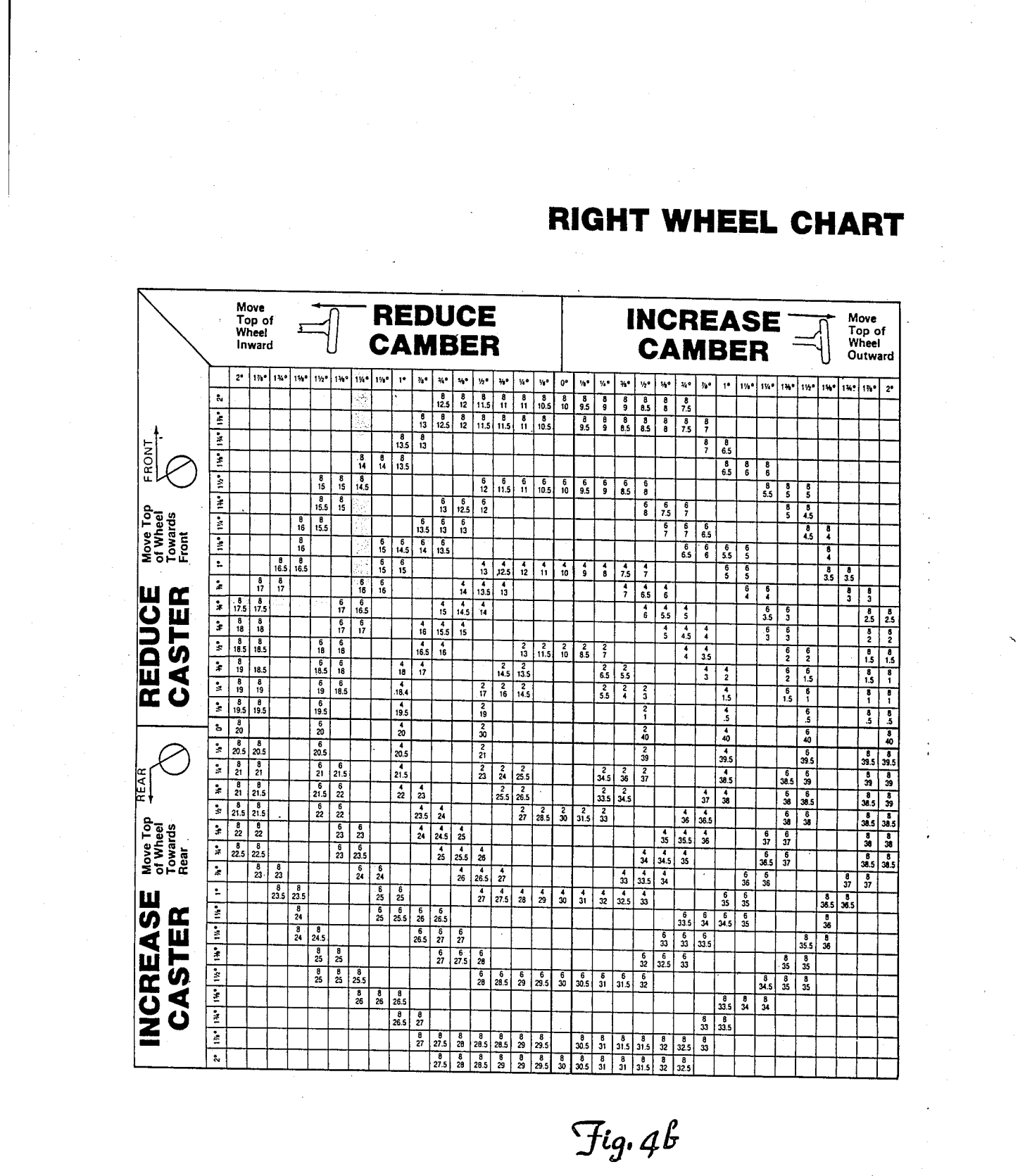

In FIGS. 4A and 4B, another aspect of the invention is illustrated. A data base in the form of a chart provides an efficient method of facilitating the mechanics selection of an appropriate adjustment bushing 62 from amongst an array of increasingly severe offsets. The chart incorporates a desired adjustment in camber on the abscissa and a desired adjustment in caster on the ordinate. At the intersection of the two desired parameters, the alignment technician finds two numbers. The upper number indicates the most appropriate adjustment bushing 62, the lower number indicates the indicium upon the scale 88 with which the appropriate bushing should be angularly oriented to properly distribute the correction offset between caster and camber. The slot 72 may serve as a direction indicator on the bushing 62 or, preferably, a separate arrow or mark may be provided to increase precision and accuracy. Additionally, the bushing may contain an identifier to distinguish it from other members of an array of offset bushings.

An alignment technician would employ the bushing indexing tool 62 and data base or chart in realigning a vehicle steering structure in the following manner: upon determining that the vehicle requires an adjustment, the technician first determines whether either steering structure, right or left side, currently contains an offset bushing (as opposed to a bushing free of offset). If so, the offset bushing is removed and replaced with a bushing without offset. Next, the technician checks the steering structure for excessive wear or "play" which might result in irreproducable alignment readings. Additionally, the technician checks that the vehicle is level, that the tire size and air pressure are appropriate.

At this point, the technician measures and records initial caster and camber readings for each front wheel steering structure of the vehicle. Next, the technician compares the initial caster and camber readings with the manufacturer's suggested readings and determines the difference in each parameter for each steering structure which must result from his adjustment. Having determined the desired adjustment, the technician next refers to the data base for assistance in selecting the most appropriate bushing 62 and the angular orientation of that bushing which will provide the desired change in caster and camber for each steering structure. For example, with respect to the left front steering structure, a mechanic might determine that the camber should be increased by 1° and the caster should be increased by 1°. On the left wheel chart FIG. 4A, the technician locates the 1° column on the top of the chart (upper righthand edge) and the 1° row (lower lefthand side) of the chart. Reading down the camber column and across the caster row, the technician locates the box where the column and row intersect. That box suggests that the mechanic use a #6 offset adjustment bushing and that the bushing be aligned with the #5 indicium on the bushing indexing tool.

Similarly, for the right wheel, a mechanic might determine that the appropriate adjustment is a camber reduction of ¼° and a caster reduction of ¾°. Employing the right wheel chart FIG. 4B, the technician locates the column corresponding to reduce camber ¼° (along the upper lefthand edge) and the row designated reduced caster ¾° (along the upper lefthand side) of the right wheel chart FIG. 4A. The column and row intersect in a box containing 6 and 16.5 suggesting that the technician should employ a #6 offset bushing and that the bushing should be oriented such that it is lined up with a position half-way between the indicium 16 and the indicium 17 on the scale of the bushing index tool.

This demonstrates a feature of the alignment system. The bushing has a continuum of rotational positions; the indexing tool scale assists the technician in easily locating the best angular orientation by providing a plurality of indicia. The technician is, however, not limited to specific positions on the scale.

Next, the technician removes the bushing without offset (by loosening the pinch bolt 52) and "snaps" the bushing indexing tool 80 onto the upper axle arm 16. A new bushing 62 is installed and oriented such that it lines up with the predetermined indicium on the scale. In the example given above, the #6 bushing for the right wheel would be aligned between indicia #16 and #17. The #6 bushing installed for the left wheel would be aligned with indicium #5 on the bushing indexing tool 80. To facilitate this rotation adjustment, the bushings 62 include flats 68 and 70 on the shoulder 66 such that they may be easily turned with a spanner or wrench. To complete the alignment, the alignment technician retightens the pinch bolt 52, thus frictionally locking the tapered stud 54 within the tapered bore 74 of the bushing 62 and the bushing 62 within the bushing receiving opening 48 of the upper yoke arm 16. Finally, the technician removes the bushing indexing tool 80.

It should be noted that the same tool 80 can be employed on the steering structure on either side of the vehicle. When employed on the left side steering structure, the tab 98 will be in contact with the rearward surface of the yoke face rather than the forward surface of the yoke face. Such a use is also contemplated in the construction of the data bases FIGS. 4A and 4B, such that one scale on the tool will work for either side of the vehicle. With minor variations in the scale and data base correlation, the tool could be employed on alternative design steering structures which employ offset bushing adjustments at the lower yoke arm. The snapping arrangement of the tool is such that the tool will remain in position on a downward facing surface such as that seen on a lower yoke arm 14.

Although the preferred embodiment presented in this application contemplates a series of four eccentric offset bushings applicable to certain two-wheel drive pickup trucks produced in 1986 and 1987, the invention is generally applicable to other systems. Specifically contemplated alternative embodiments include offset bushings having bores 74 with axes 76 angled or skewed with respect to the axes of the cylindrical body 64 and available in more or less numerous arrays of bushings. Other offset adjustments employing threaded bushings or bearings are also contemplated by the present invention. Further, a kit including a tool and a chart or a tool, a chart and an array of bushings is contemplated, as well as the method of use.

An alternative method avoids the installation of the zero offset bushing by a double use of a chart. First, the initial caster and camber are noted along with the bushing identification and orientation. This allows a determination of the theoretical caster and camber which would be obtained with a zero offset bushing. The alternate method then proceeds as previously described. Alternative data base means, such as tables or computer calculation from initial parameters, are also possible.

Although the present invention has been described with reference to prefered embodiments, workers skilled in the art will recognize that changes may be made in form and detail without departing from the spirit and scope of the invention.

What is claimed is:

1. A tool for assisting in aligning a wheeled vehicle steering structure having a rotatable caster and camber adjustment offset bushing, the tool comprising:
   a plate having an upper tool surface and
   an aperture in the upper tool surface extending through the plate;
   means for reproducibly positioning and attaching the plate on the steering structure; and
   scale means on the upper tool surface disposed around the aperture, having a plurality of indicia, each indicia indicating an angular position of the rotatable adjustment bushing with respect to the steering structure.

2. The tool of claim 1 wherein at least one of the indicia is referenced in a data base means, the data base means providing a relationship between an indicium and a caster and camber combination.

3. The tool of claim 2 wherein the data base means is a chart and the chart further includes a bushing selection aspect.

4. The tool of claim 1 wherein the bushing is capable of passing through the aperture.

5. The tool of claim 1 wherein the means for reproducibly positioning and attaching includes a protrusion depending from a notch on the upper tool surface, such that the protrusion allows the tool and thereby the aperture to be positioned on the vehicle steering structure in a unique orientation and prevents installation in alternative orientations.

6. The tool of claim 1 wherein the means for positioning attaching includes a pair of opposing resilient flanges on the plate, the flanges depending downward, away from the upper tool surface, such that the tool is held in a reproducible position on the steering structure.

7. The tool of claim 6 wherein one of the resilient flanges includes an inward projecting tab, the tab being effective to provide a frictional attachment to the steering structure.

8. A method of aligning a wheeled vehicle steering structure having a rotatable caster and camber adjustment offset bushing using the tool of claim 1, the method comprising the steps:
   measuring the initial caster and camber of the steering structure;

determining, from a data base means, with which scale means indicium the bushing should be aligned in order to provide the desired caster and camber;

positioning the tool on the steering structure with the aperture concentric with the bushing; and aligning the bushing with the previously determined scale means indicium by rotating the bushing.

9. The method of claim 8 further comprising the steps:

selecting an appropriate rotatable adjustment offset bushing from an array of offset bushings by employing a data base, such that, the bushing provides the desired caster and camber; and exchanging the initial bushing of the steering structure for the selected appropriate bushing.

10. The method of claim 9 further comprising the step:

removing the tool.

11. A kit for assisting in aligning a wheel vehicle steering structure having a rotatable adjustment offset bushing, the kit comprising:

means for indexing a bushing's rotational position on the steering structure, including means for attaching the means for indexing to the steering structure; and correlating means for relating a desired caster and camber with the indexing means.

12. The kit of claim 11 further comprising:

a rotatable adjustment bushing.

13. The kit of claim 12 wherein the bushing is a member of an array of bushings capable of progressively larger offsets.

* * * * *

UNITED STATES PATENT AND TRADEMARK OFFICE
CERTIFICATE OF CORRECTION

PATENT NO. : 4,831,744

DATED : May 23, 1989

INVENTOR(S) : Gerald A. Specktor et al

It is certified that error appears in the above-identified patent and that said Letters Patent is hereby corrected as shown below:

Col. 8, lines 54-55, after "positioning", insert --and--.

Col. 9, delete line 1-7 and insert the following:

determining, from a data base means, with which scale means indicium the bushing should be aligned in order to provide the desired caster and camber;

positioning the tool on the steering structure with the aperture concentric with the bushing; and aligning the bushing with the previously determined scale means indicium by rotating the bushing.

Signed and Sealed this

Sixth Day of February, 1990

*Attest:*

JEFFREY M. SAMUELS

*Attesting Officer*     *Acting Commissioner of Patents and Trademarks*